United States Patent
Ho (10) Patent No.: US 8,820,188 B2
(45) Date of Patent: Sep. 2, 2014

(54) PARK-POSITION MECHANISM FOR ENGINE

(75) Inventor: Chao-Chang Ho, Kaohsiung (TW)

(73) Assignee: Kwang Yang Motor Co., Ltd., Kaohsiung (TW)

(*) Notice: Subject to any disclaimer, the term of this patent is extended or adjusted under 35 U.S.C. 154(b) by 1235 days.

(21) Appl. No.: 11/420,005

(22) Filed: May 24, 2006

(65) Prior Publication Data

US 2008/0073172 A1 Mar. 27, 2008

(51) Int. Cl.
  *F16H 63/00* (2006.01)
  *F16H 63/48* (2006.01)
  *F16D 65/14* (2006.01)
  *F16D 63/00* (2006.01)
  *G05G 5/08* (2006.01)
  *F16H 63/18* (2006.01)

(52) U.S. Cl.
  CPC .............. *F16H 63/48* (2013.01); *F16D 63/006* (2013.01); *F16H 63/18* (2013.01)
  USPC .................. 74/473.28; 74/473.21; 192/219.5; 192/219.4

(58) Field of Classification Search
  USPC ........... 74/337.5, 473.1, 473.19, 335, 473.21; 192/219.5, 219.4
  See application file for complete search history.

(56) References Cited

U.S. PATENT DOCUMENTS

| | | | | |
|---|---|---|---|---|
| 3,024,775 A | * | 3/1962 | Wuest | 123/90.33 |
| 6,725,962 B1 | * | 4/2004 | Fukuda | 180/292 |
| 2005/0205384 A1 | * | 9/2005 | Reed et al. | 192/219.5 |

* cited by examiner

*Primary Examiner* — Daniel Yabut
(74) *Attorney, Agent, or Firm* — Leong C. Lei (57) ABSTRACT

A park-position mechanism includes a selector mechanism that includes a cam mounted on a selector hub shaft, a park gear mounted on a main shaft and corresponding in position to the cam, a park arm arranged between the cam and the park gear. The park arm has a holed base fit over a stud that rotates and supports the park arm in a crankshaft case. A torsion spring is arranged between the park arm and the crankshaft case with ends attached to the park arm and the crankshaft case respectively. The park arm has a driven section and an engaging section respectively extending from opposite sides of the holed base. The engaging section forms a projection. The driven section forms a hole in which a guide rod is received in an axially movable manner. The guide rod is engaged with the earn and is thus selectively driven by the cam to cause engagement of the projection of the engaging section with the park gear. A resilient member is arranged between the hole and the guide rod. The resilient member and the guide rod function to absorb a driving force induced by the earn to eliminate direct application of the force on the driven section thereby protecting the park arm from being damaged by excessive amount of force acting thereon and enhancing operation smooth of switching to the PARK position.

5 Claims, 12 Drawing Sheets

FIG.2

PRIOR ART

PARK-POSITION MECHANISM FOR ENGINE

BACKGROUND OF THE INVENTION (a) Technical Field of the Invention

The present invention relates to a park-position mechanism for an engine, and in particular to a mechanism for enhancing operation smoothness for switching to a park position.

(b) Description of the Prior Art

Figure 1:
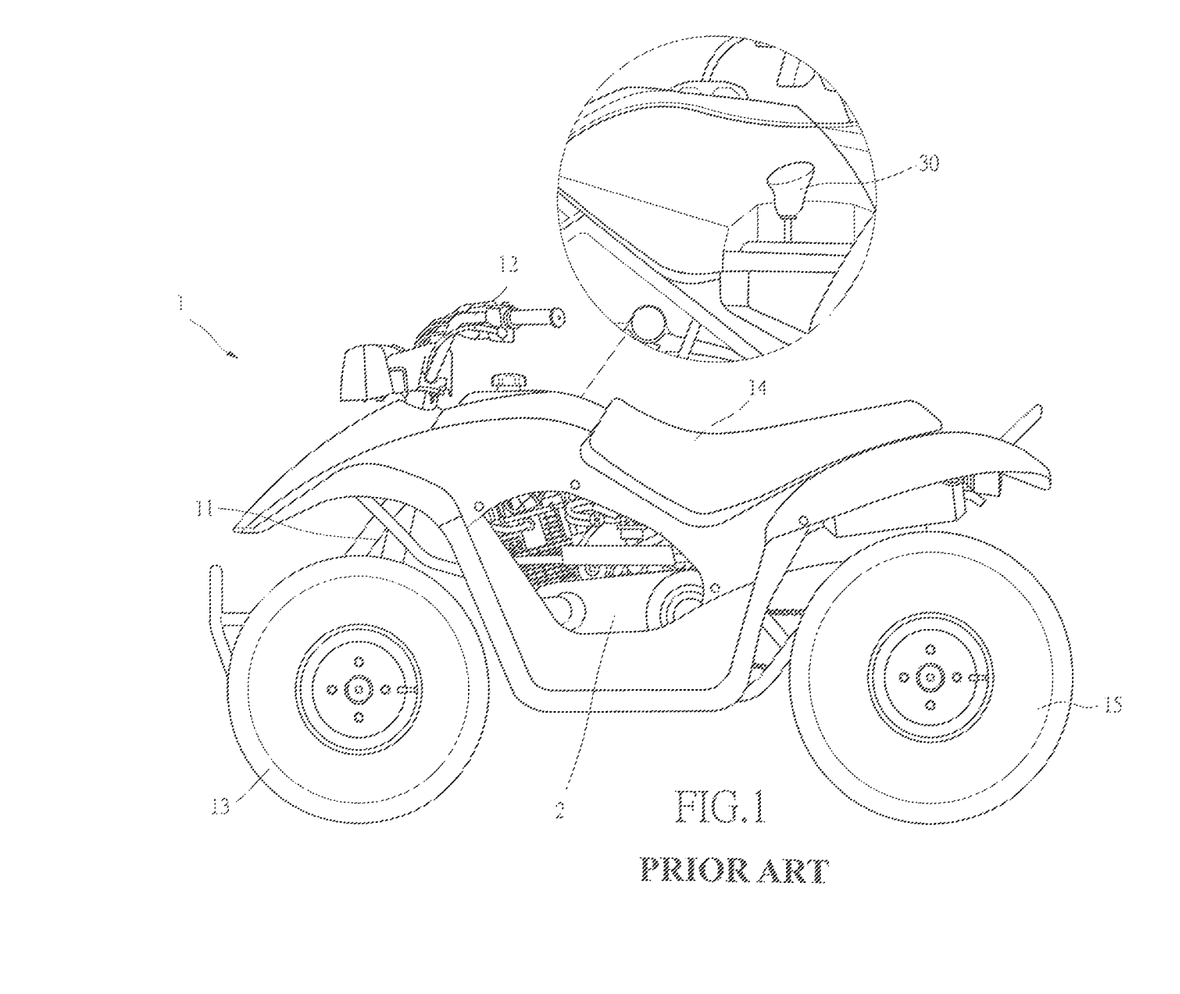
FIG. 1 is a side elevational view of a conventional all-terrain vehicle.

As shown in FIG. 1 of the attached drawings, an all-terrain vehicle (ATV), generally designated with reference numeral 1, comprises a vehicle frame 11, a steering mechanism 12, front wheels 13, a seat section 14, rear wheels 15, a power unit 2 that provides mechanical power for driving the all-terrain vehicle 1. The steering mechanism 12 is mounted in a way which, allows for rotation to a front end of the frame 1 and the front wheels 13 are mounted at a lower portion of the steering mechanism 12. The seat section 14 is arranged on a top side of the frame 11 behind the steering mechanism 12. The power unit 2 is arranged below the seat section 14.

Figure 2:
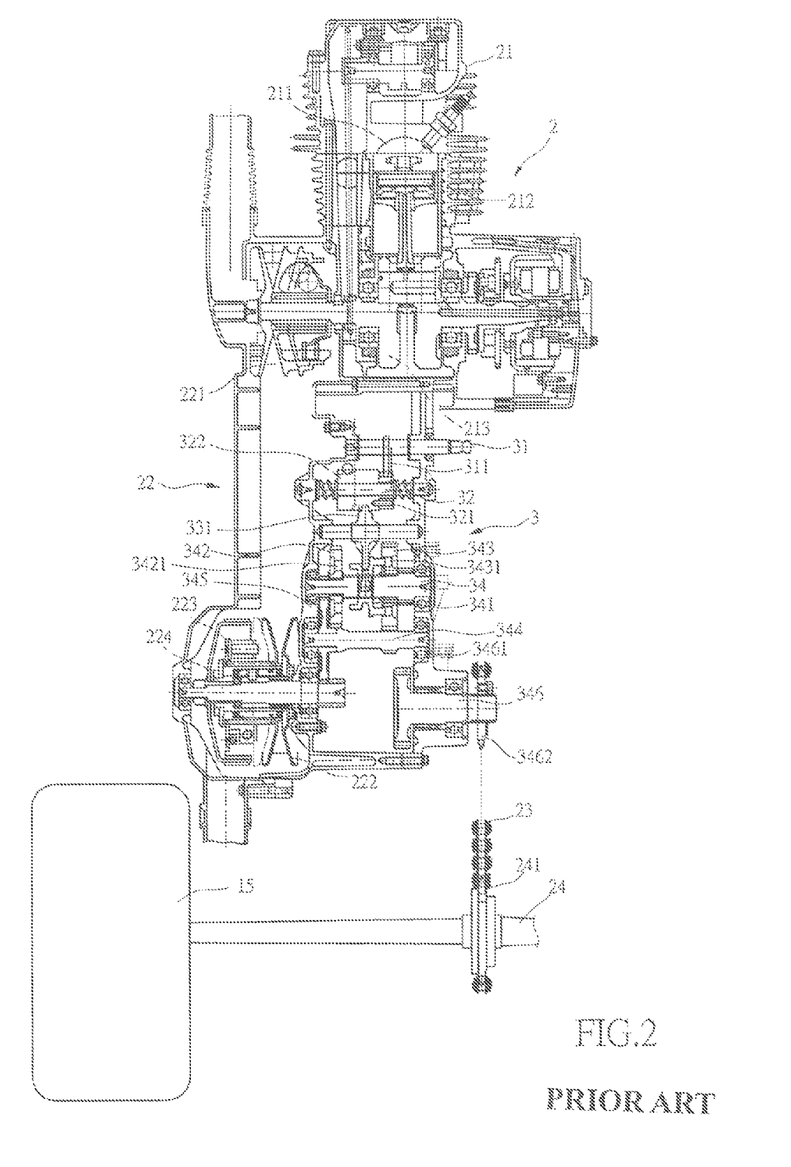
FIG. 2 is a cross-sectional view of a conventional transmission mechanism of the all-terrain vehicle.

The power unit 2, as shown in FIG. 2 of the attached drawings comprises an engine system 21 and a stepless transmission system 22 that is driven by the engine system 21. The stepless transmission system 22 is coupled to a rear wheel axle 24 by a chain 23 to drive the rear wheels 15 that are attached to the rear wheel axle 24.

Figure 3:
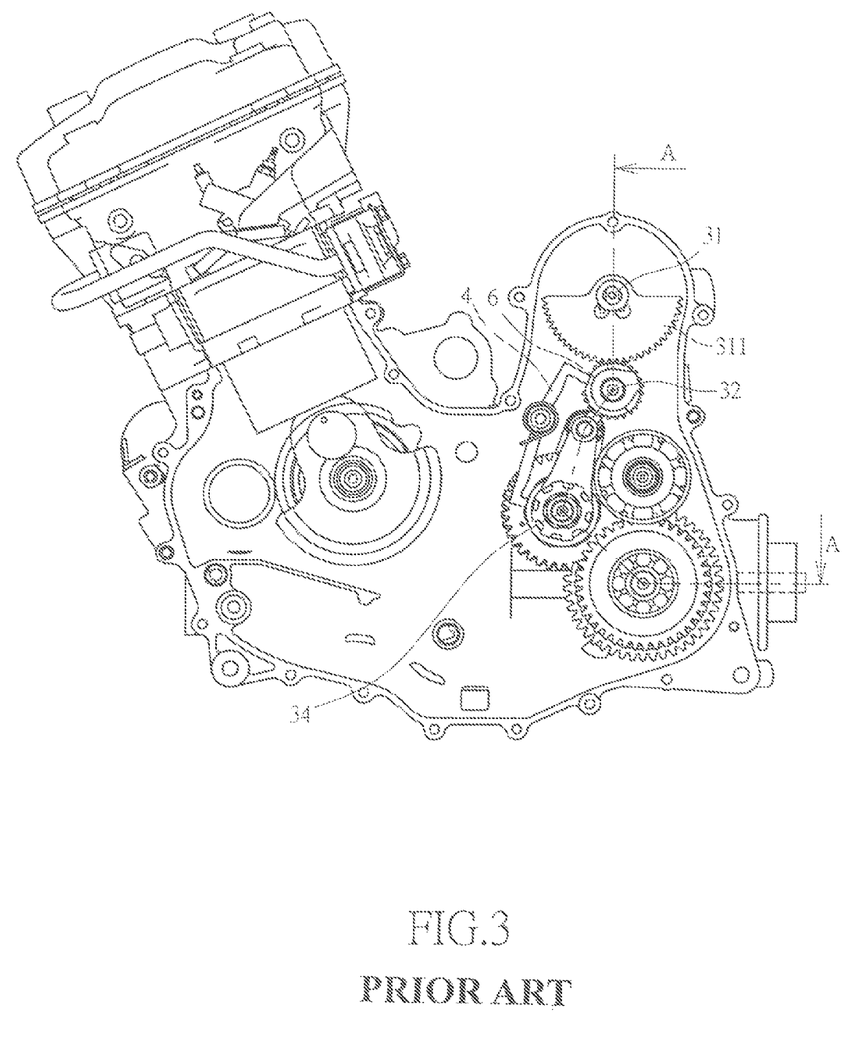
FIG. 3 is a cross-sectional view of a portion of a conventional engine of the all-terrain vehicle.

Switching between forward and reversed movements of the all-terrain vehicle 1 is done with a selector mechanism 3. A conventional selector mechanism 3 is shown in FIGS. 2 and 3 of the attached drawings, comprising a selector rod 31 that has a gear 311 mating a gear 321 mounted on a selector hub shaft 32. The selector huh shaft 32 supports a selector hub 322 that is axially movable along the shaft 32. Position-selection slots (not labeled) are formed on the selector hub 322 for defining positions of the selector mechanism 3, such as a "DRIVE" position, a "NEUTRAL" position, a "REVERSE" position, and a "PARK" position.

A shaft 33 carries a fork 331 having an end engaging the position-selection slots of the selector hub 322 and an opposite end engaging a slide block 341 mounted on a main shaft 34. The slide block 341 is axially movable along the main shaft 34. A forward gear 342 and a reversing gear 343 are mounted to opposite sides of the slide block 341. The reversing gear 343 is coupled to a reversing shaft 344 and the reversing shaft 344 supports a switching gear 345 located on an opposite end. The switching gear 345 is coupled to a driven shaft 221 of the stepless transmission system 22.

The main shaft 34 is coupled to a gear 3461 of an output shaft 346. An output toothed wheel 3462 is mounted to an outer end of the output shaft 346 and is coupled to the rear wheels 15 by the chain 23.

As shown in FIG. 2, when, the engine system 21 is started, the power generated by the combustion of fuel inside a combustion chamber 211 of the engine system 21 causes a piston 212 to do reciprocal movement, which in turn rotates a crankshaft 213. A drive pulley 221 that is mounted to the crankshaft 213 is synchronously rotated with the crankshaft 213 and in turn drives a driven pulley 222 of the stepless transmission system 22, which in turn rotates a driven shaft 224 through a clutch 223. The driven shaft 224 drives the forward gear 342 and also rotates the reversing gear 343 through the switching gear 345 and the reversing shaft 344.

With reference to FIGS. 1-3, to select the DRIVE position, an operation lever 30 is manually moved fern an "N" position, to a "D" position, which moves the selector rod 31 and the gear 311 of the selector rod 31 in turn drives the gear 321 of the selector hub shaft 32 to rotate the selector huh 322. The fork 331 is thus forcibly moved along the position-selection slot of the selector hub 322 toward the DRIVE position. At the same time, the selector hub 322 is forcibly moved rightward to contract a compression spring 324 in the rightward direction. The opposite end of the fork 331 simultaneously drives the slide block 341 to move leftward along the main shaft 34, whereby the slide block 341 engages holes 3421 defined in the forward gear 342, causing the forward gear 342 to rotate the main shaft 34. The main shaft 34 then drives the gear 3461 to synchronously rotate the output shaft 346, which in turn drives a toothed wheel 241 mounted to the rear wheel axle 24 for rotating die rear wheel axle 24 in the direction for driving the all-terrain vehicle 1 forward.

To reverse the all-terrain vehicle 1, the operation lever 30 is manually switched to an "R" position, which in turn moves the selector lever 31 to cause the gear 311 of the selector lever 31 to drive fee gear 321 of the selector hub shaft 32 for rotating the selector hub 322. The fork 331 is then caused to move along the position-selection slot of the selector huh 322 to the REVERSE position, and at the same time, the selector hub 322 is forcibly moved leftward to contract a compression spring in the leftward direction. The opposite end of the fork 331 simultaneously drives the slide block 341 to move rightward along the main shaft 34, whereby the slide block 341 engages holes 3431 defined in the reversing gear 343, causing the reversing gear 343 to rotate the main shaft 34, which in turn causes the toothed wheel 241 of the rear wheel axle 24 to rotate in the direction for reversing the all-terrain vehicle 1 via the chain 23.

Figure 4:
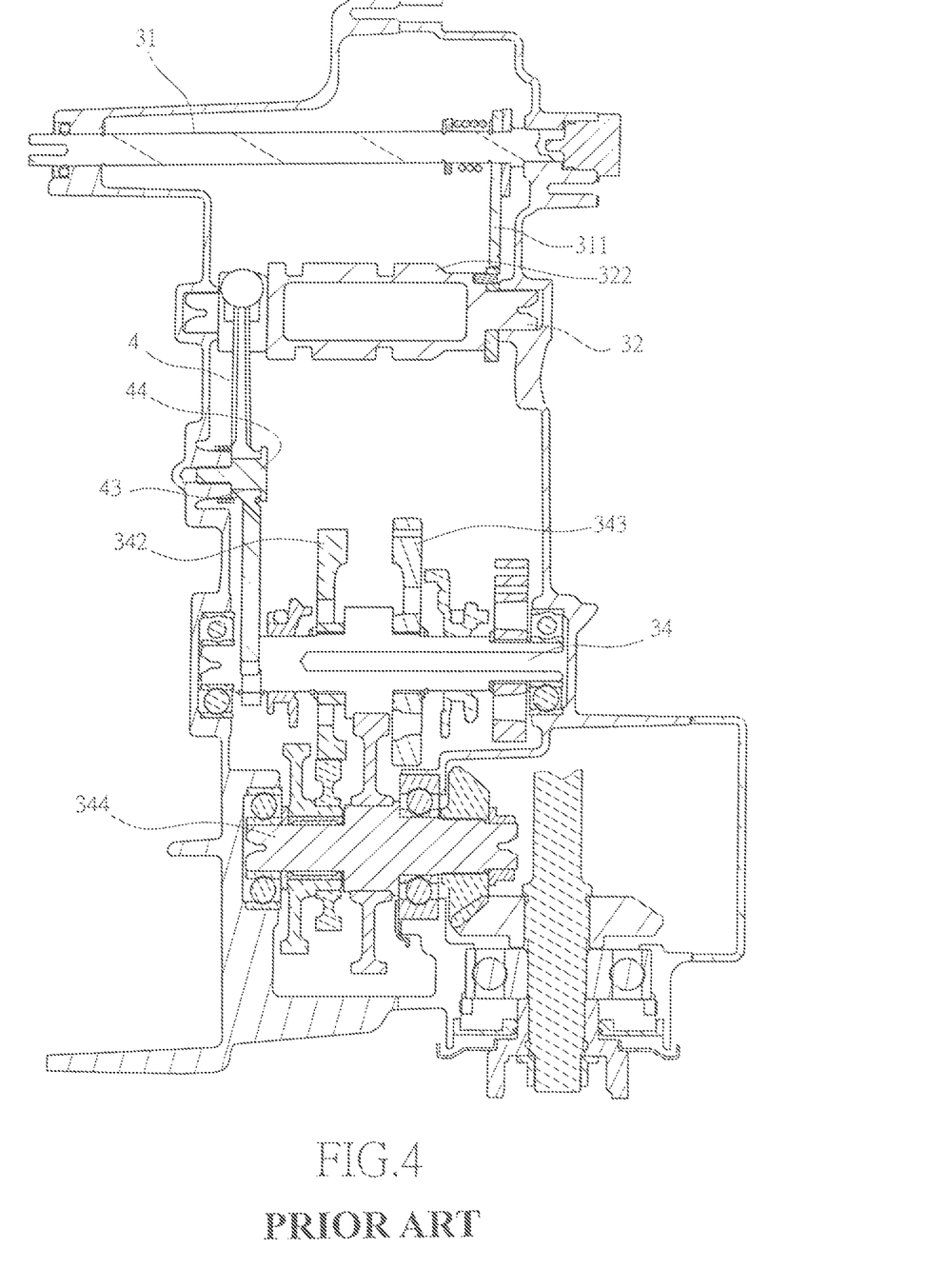
FIG. 4 is a cross-sectional view taken along line A-A of FIG. 3.
Figure 5:
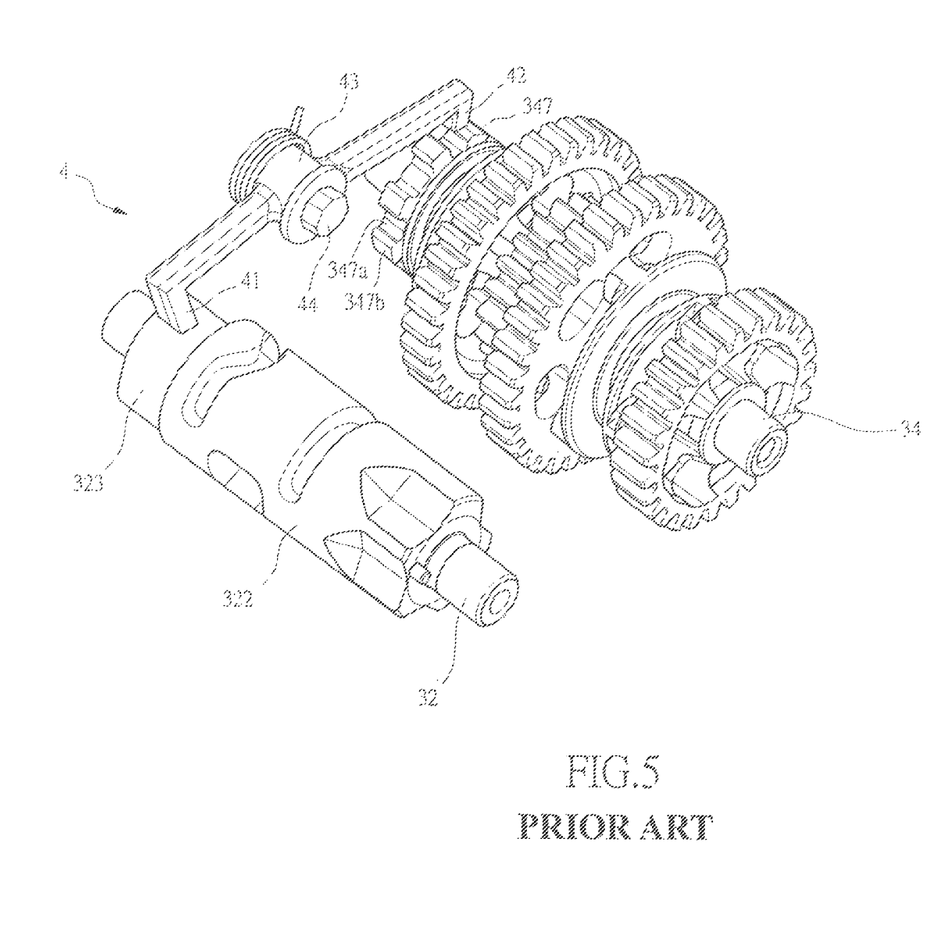
FIG. 5 is a perspective view of a conventional park-position mechanism for the all-terrain vehicle.

To park the all-terrain vehicle 1 in a stable stop condition, the selector mechanism 3 is also provided with a PARK position, which as shown in FIGS. 3-5, is comprised of a cam 323 mounted on the selector hub shaft 32 by the selector hub 322 and a park gear 347 arranged on the main shaft 34 at a position corresponding to the cam 323. A park arm 4 is arranged between the cam 323 and the park gear 347 and has opposite ends forming projections 41,42 respectively engageable with the cam 323 and the park gear 347.

The park arm 4 forms a holed base 43 that is rotates and fits over a stud 44. The stud 44 is fixed on a crankshaft case 2a to server as a rotational axis of the park arm 4, whereby the park arm 4 is rockable about the stud 44.

When the operation lever 30 is switched to a "P" position, the selector lever 31 moves the gear 311 to cause displacement of the selector hub 322 whereby the cam 323 by the selector hub 322 forces the projection 41 of the park arm 4 upward and simultaneously the projection 42 on the opposite side of the park arm 4 is driven downward to engage a dedendum trough 347 between adjacent teeth of the park gear 347 so as to fix the main shaft 34, thereby securing the main shaft 34 and the rear wheels 15 and making the all-terrain vehicle 1 in a stable parking condition.

Although effective in securing the main shaft 34 and the rear wheels 15 in a parked condition, the conventional mechanism suffers certain drawbacks. For example, and as shown in FIG. 5, when the projection 41 of the park arm 4 is moved upward by the cam 323, and the opposite projection 42 is simultaneously driven downward, due to the width of fee teeth of the park gear 347, the projection 42, during its downward movement, may accidentally get into contact with an addendum top face 347b of a tooth of the park gear 347, whereby the projection 42 cannot move into the trough 347a until the main shaft 34 and thus the park gear 347 make a further rotation to align the trough 347a with the projection 42. During the period when the projection 42 is in contact with the top face 347b of the tooth of the park gear 347, the projection 41 of the park arm 4 is continuously forced upward by the cam 323, which causes operation trouble in switching to the PARK position.

Further, the trouble that the projection 42 is prevented from lowering into the tooth trough 347a by the top face 347b while the projection 41 is continuously moved upward induces undesired strains in the park arm 4, which may eventually damage the park arm 4.

Thus, it is desired to provide a park-position mechanism that allows for smooth position switching and protects the mechanism itself for endured service life.

SUMMARY OF THE INVENTION

The primary purpose of the present invention is to provide a park-position mechanism comprising a selector mechanism that comprises a cam mounted on a selector hub shaft, a park gear mounted on a main shaft and corresponding in position to the cam, a park arm arranged between the cam and the park gear. The park arm has a holed base, which fits over a stud that rotates and supports the park arm in a crankshaft case. A torsion spring is arranged between the park arm and the crankshaft case with ends attached to the park arm and the crankshaft case respectively. The park arm has a driven section and an engaging section respectively extending from opposite sides of the holed base. The engaging section forms a projection. The driven section forms a hole in which a guide rod is received in an axially movable manner. The guide rod is engaged to the cam and is thus selectively driven by the cam to cause engagement of the projection of the engaging section with the park gear. A resilient member is arranged between the hole and the guide rod. The resilient member and the guide rod function to absorb a driving force induced by the cam to eliminate direct application of the force on the driven section thereby protecting die park arm from being damaged by excessive amount of force acting thereon and enhancing operation smooth of switching to the PARK position.

Another objective of the present invention is to provide a park-position mechanism wherein the resilient member and the guide rod that function to absorb a driving force induced by a cam are mounted on a driven section of the park arm to allow these components to be assembled easily and to simplify the assembling process thereof.

The foregoing object and summary provide only a brief introduction to the present invention. To fully appreciate these and other objects of fee present invention as well as the invention itself, all of which will become apparent to those skilled in the art, the following detailed description of fee invention and fee claims should be read in conjunction with the accompanying drawings. Throughout the specification and drawings identical reference numerals refer to identical or similar parts.

Many other advantages and features of fee present invention will become manifest to those versed in the art upon making reference to the detailed description and fee accompanying sheets of drawings in which a preferred structural embodiment incorporating fee principles of the present invention is shown by way of illustrative example.

BRIEF DESCRIPTION OF THE DRAWINGS

The present invention will be apparent to those skilled in the art by reading the following description of a preferred embodiment of the invention, with reference to the attached drawings, in which.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 6:
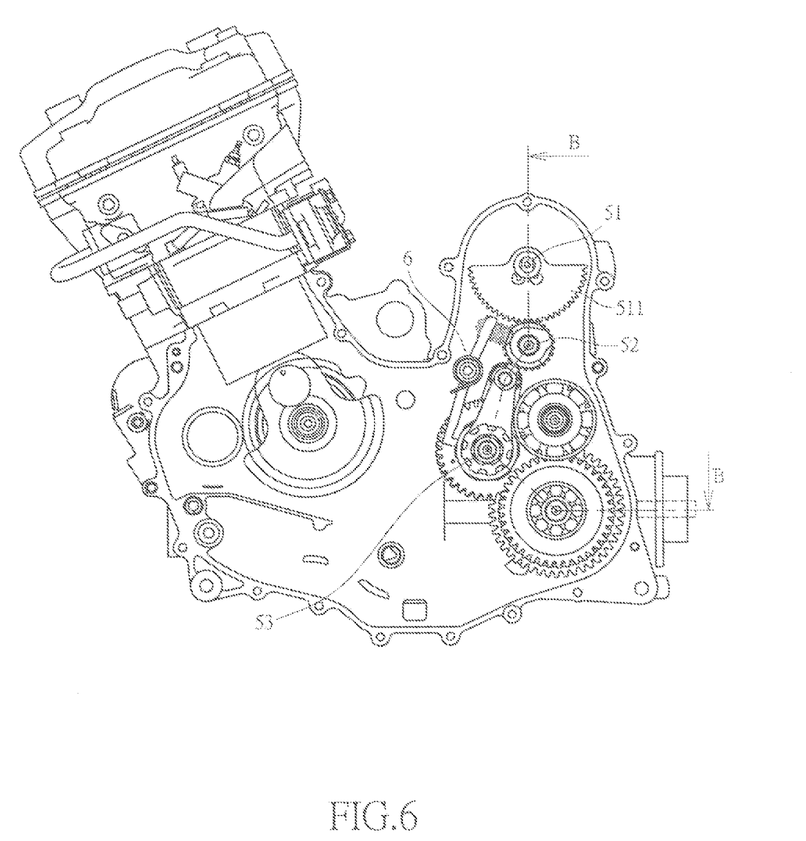
FIG. 6 is a cross-sectional view of a portion of an engine in accordance with the present invention.
Figure 7:
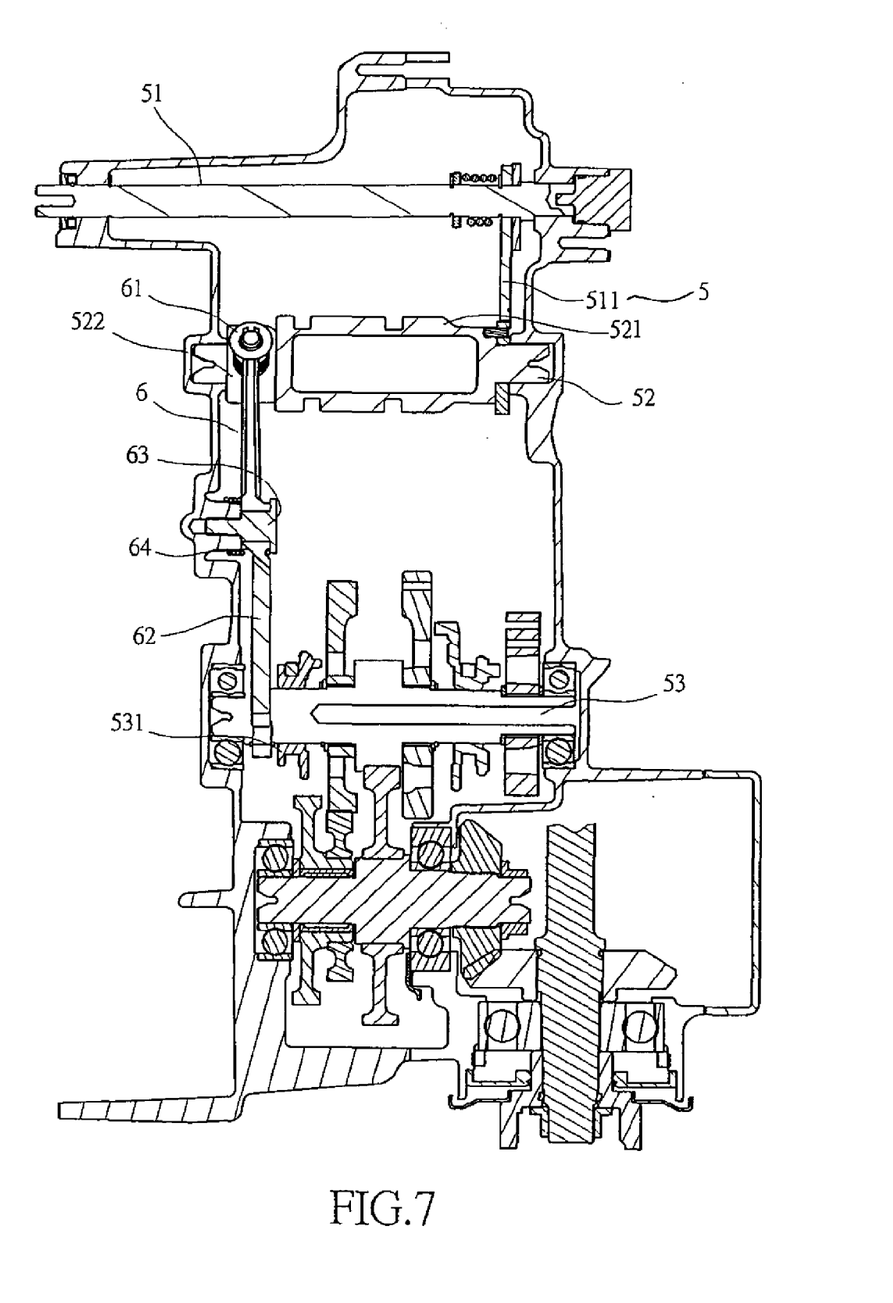
FIG. 7 is a cross-sectional view taken along line B-B of FIG. 6.
Figure 8:
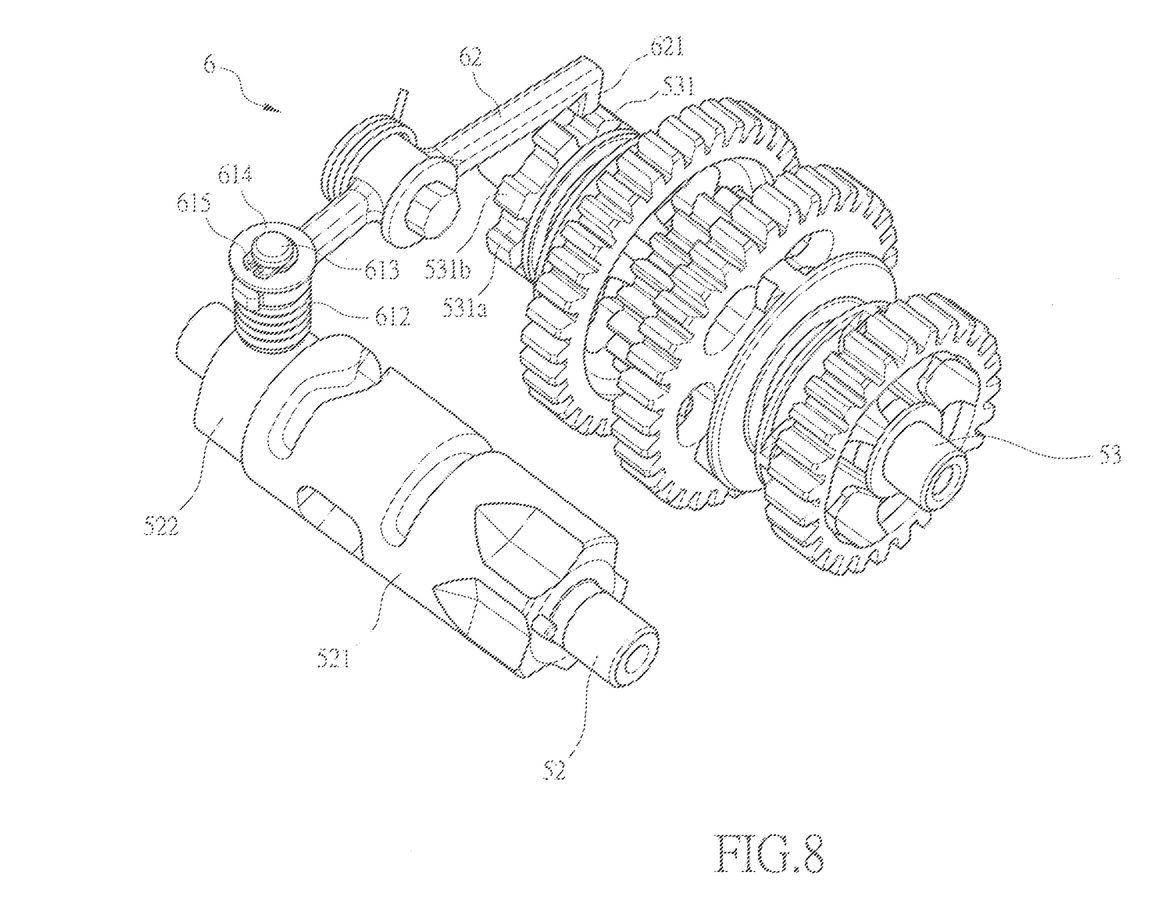
FIG. 8 is a perspective view of a park-position mechanism in accordance with the present invention.

With reference to the drawings and in particular to FIGS. 6-8, a park-position mechanism constructed in accordance with the present invention comprises a cam 522 arranged by a selector hub 521 that is mounted on a selector hub shaft 52 that constitutes partly a selector mechanism 5 of for example an all-terrain vehicle. A park gear 531 is mounted on a main shaft 53 of the selector mechanism 5 and corresponding in position to the cam 522. A park arm 6 is arranged between the cam 522 and the park gear 531.

Figure 9:
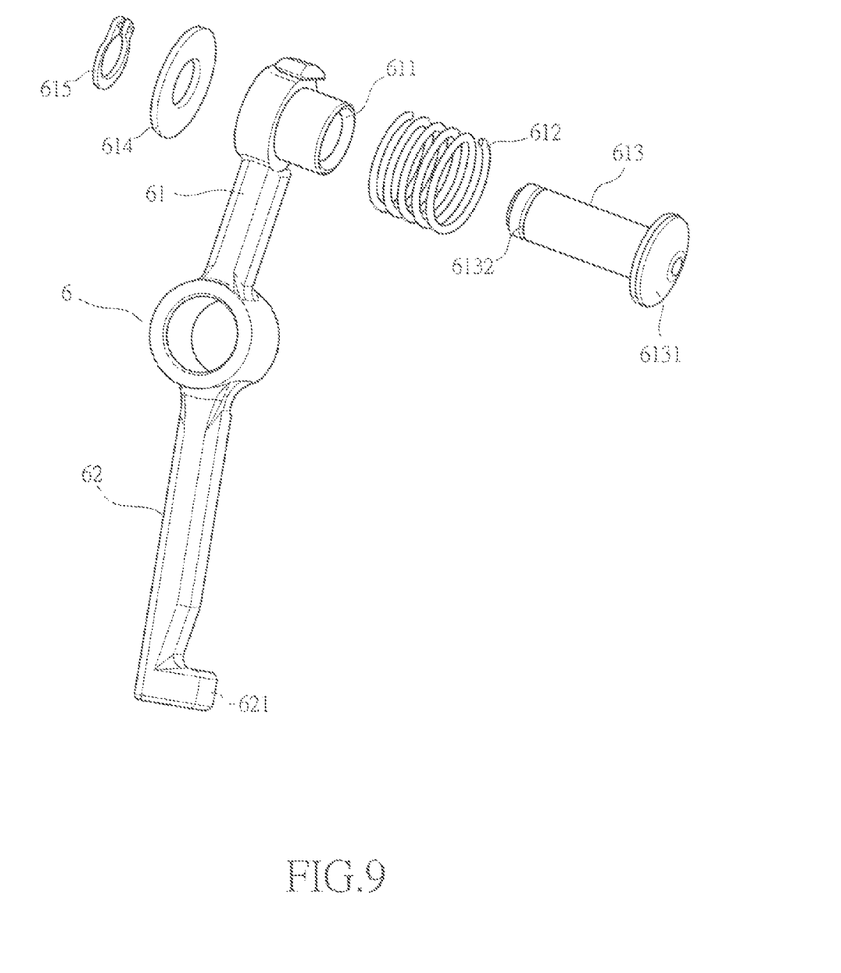
FIG. 9 is an exploded view of a park arm of the park-position mechanism of the present invention.

Also referring to FIG. 9, the park arm 6 forms a centrally-located holed base 618 that rotates and fits over a stud 63 that rotates and supports the park arm 6 in a crankshaft case and to allow the park arm 6 to rock about the stud 63 with opposite ends displaced upward and downward. A torsion spring 64 is arranged between the holed base 618 of the park arm 6 and the crankshaft case with opposite ends of the torsion spring 64 attached to the park arm 6 and the crankshaft case. A driven section 61 and an engaging section 62 are respectively formed on opposite ends of the park arm 6. The driven section 61 comprises a cylindrical extension through which a guide hole 611 is defined. A resilient member 612, such as a helical spring, is mounted to a front side of the guide hole 611 and encompasses a guide rod 613, which also extends through the guide hole 611. The guide rod 613 has a front end forming an expanded stop 6131 and an opposite rear end forming a circumferential groove 6132. A stop ring 614 is fit on the rear end portion of the guide rod 613 and is retained on the guide rod 613 by a clip 615 that is received in the circumferential groove 6132 of the guide rod 613. The expanded stop 6131 on the front end of the guide rod 613 has an outside diameter greater than diameters of the resilient member 612 and the guide hole 611 and serves to retain the resilient member 612 in position at the front side, while the resilient member 612 is retained by the stop ring 614 at the rear side. With such an arrangement, the guide rod 613 is allowed to axially move with respect to the guide hole 611 with the expanded stop 6131 engaging the cam 522. The engaging section 62 of the park arm 6 comprises a bent end forming a projection 621 that is normally located above the park gear 53 and is selectively moved toward and engages the park gear 53 when the selector mechanism 5 is switched to the PARK position.

Figure 10:
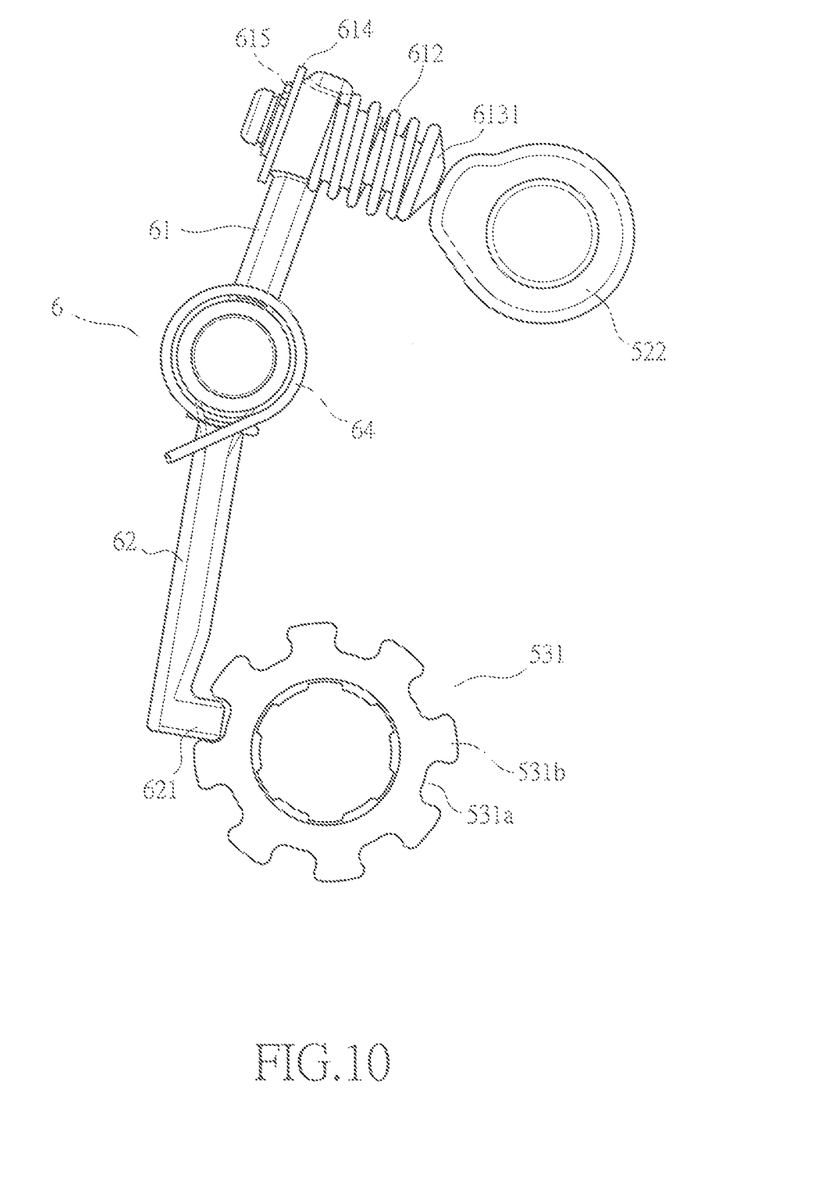
FIG. 10 is a side elevational view showing the park-position mechanism in a condition where a main shaft of the transmission is secured by the park-position mechanism.

Referring now to FIGS. 7, 8, and 10, when the operation lever is switched to the "P" position (not shown in the drawings), the selector lever 51 of the selector mechanism 5 moves the gear 511 mounted thereto to cause displacement of the selector hub 521 whereby the cam 522 arranged next to the selector hub 521 forces the expanded stop end 6131 of the guide rod 613 of the driven section 61 of the park arm 6 upward, and the force induced by the cam 522 is transmitted by the stop end 6131 of the guide rod 613 to the resilient member 612, which in turn applies the force to the driven section 61 of the park arm 6 to cause the driven section 61 to move upward. The upward movement of the driven section 61 of the park arm 6 makes the engaging section 62 of the park arm 6 simultaneously moving downward, with the torsion spring 64 compressed by the rotation of the park arm 6, to have the projection 621 of the engaging section 62 of the park arm 6 to engage a deddendum trough 531a between adjacent teeth of the park gear 531 so as to fix the main shaft 53, thereby securing the main shaft 53 and the rear wheels and making the all-terrain vehicle in a stable parking condition.

On the contrary, when the operation lever is off the "P" position, the cam 522 next to the selector hub 521 no long drives the expanded stop end 6131 of the guide rod 613 of the driven section 61 of the park arm 6, and the force induced by the cam 522 on the guide rod 613 is released, and in response thereto, the torsion spring 64 springs back and induces a torque on the park arm 6 to move the engaging section 62 away from the trough 531a of the park gear 531 thereby releasing the main shaft 53. The main shaft 53 is now allowed to rotate again.

Figure 11:
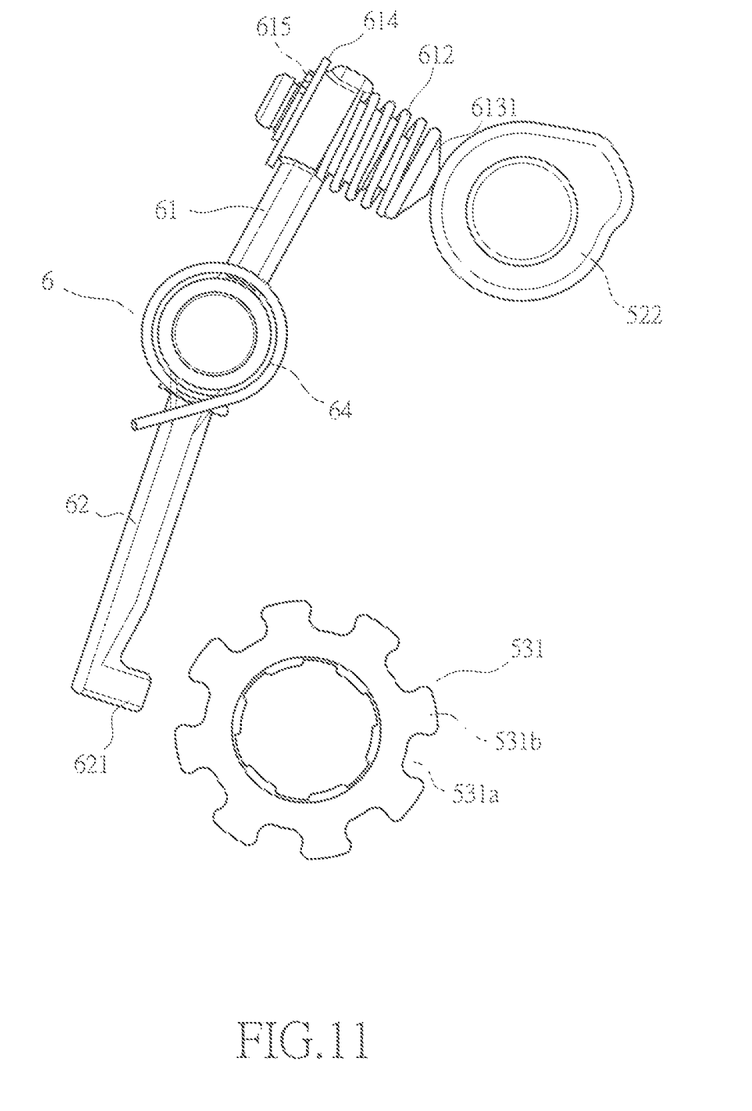
FIG. 11 is a side elevational view showing the park-position mechanism in a condition where the main shaft of the transmission is released from the park-position mechanism.
Figure 12:
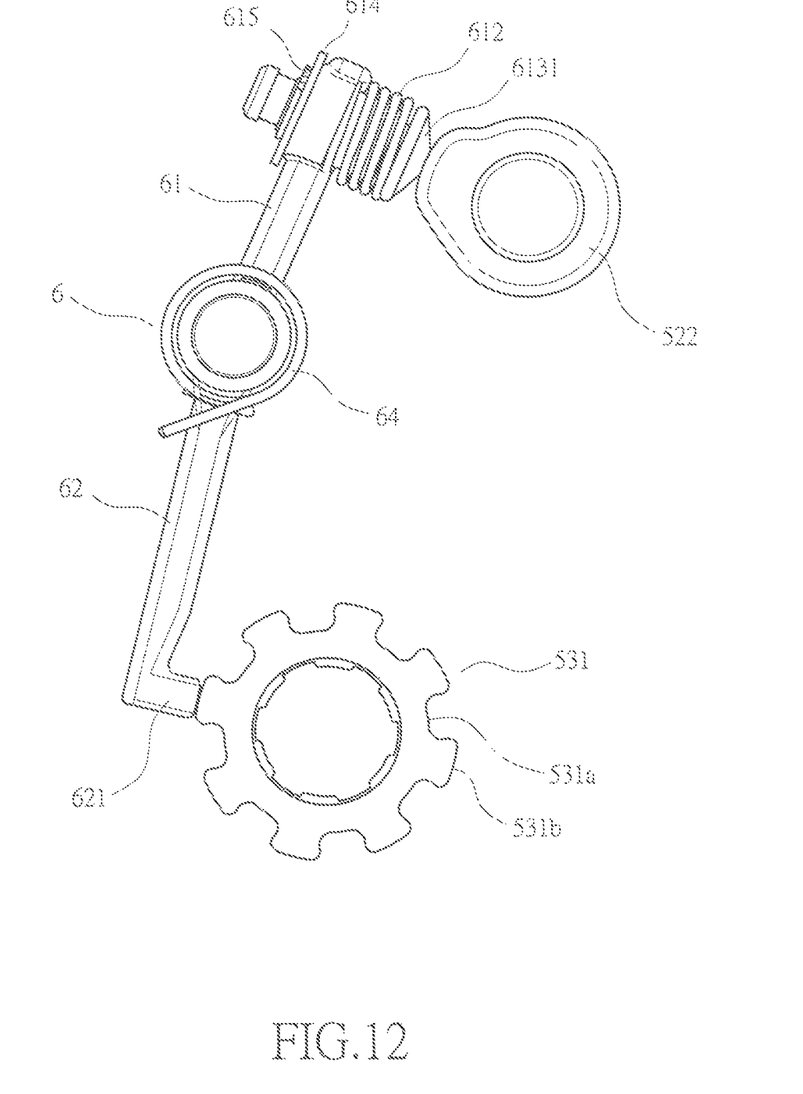
FIG. 12 is a side elevational view showing the park-position mechanism in a condition where the transmission is switched to a PARK position while the park-position mechanism does not correctly engage a park gear on the man shaft.

Also referring to FIGS. 11 and 12, during the switching to the PARK position, in case that the projection 621 of the engaging section 62 does not smoothly move into the trough 531a of the park gear 53 and is instead blocked by a top face 531b of any one tooth of the park gear 53, although the cam 522 continuously applies a force to move the guide rod 613, such a force is absorbed by the compression of the resilient member 612 with the guide rod 613 moved with respect to the driven section 61 but the driven section 61 of the park arm 6 remaining standstill. Thus, the driving force from the cam 522 is absorbed by the compression of the resilient member 612 and the relative movement of the guide rod 613 with respect to the drivers section 61. The compression of the resilient member 612 also induces a preloading of the resilient member 612, which, after the main shaft 53 makes a further rotation to align the trough 531a with the projection 621, effectively drives the projection 621 into the trough 531a to effect securing of the main shaft 53 and achieving switching to the PARK position.

The feature of the present invention is the guide rod 613 that is movably mounted to the driven section 61 of the park arm 6 and the resilient member 612 arranged between the driven section 61 and the guide rod 613, which are used to absorb the driving force acting on the driven section 61 by the cam 522 whereby when it happens that the projection 621 of the engaging section 62 of the park arm 6 is blocked by the top face 531b of a tooth of the park gear 531, the park arm 6 may not be damaged by the driving force from the cam 522 and the position switching operation is made even smoother.

In accordance with the present invention, the resilient member 612 and the guide rod 613, which function to absorb the driving force of the cam 522, are arranged on the driven section 61, which makes fee assembling of the park arm easy and simplifies the assembling process.

It will be understood that each of the elements described above, or two or more together may also fed a useful application in other types of methods differing from the type described above.

While certain novel features of this invention have been shown and described and are pointed out in the annexed claim, it is not intended to be limited to fee details above, since it will be understood that various omissions, modifications, substitutions and changes in the forms and details of the device illustrated and in its operation can be made by those skilled in the art without departing in any way from the spirit of the present invention.

I claim:

1. A park-position mechanism comprising:
a selector mechanism that comprises a cam mounted on a selector hub shaft;
a park gear mounted on a main shaft and corresponding in position to the cam, a park arm arranged between the cam and the park gear, the park arm having a holed base that is fit over a stud fixed in a crankshaft case to rotate and support the park arm in the crankshaft case;
a torsion spring being arranged between the park arm and the crankshaft case with ends attached to the park arm and the crankshaft case respectively, the park arm having a driven section and an engaging section respectively extending from opposite sides of the holed base, the engaging section forming a projection;
characterized in that the driven section forms a guide hole in which a guide rod is received in an axially movable manner, a front end of the guide rod having a stop end, the guide rod being engaged with the cam and selectively driven by the cam to cause engagement of the projection of the engaging section with the park gear, a resilient member arranged between the guide hole and the guide rod, wherein the resilient member and the guide rod function to absorb a driving force induced by the cam to eliminate direct application of the force on the driven section thereby protecting the park arm from being damaged by excessive amount of force acting thereon.

2. The park-position mechanism as claimed in claim 1, wherein the stop end is expanded.

3. The park-position mechanism as claimed in claim 1, wherein a rear end of the guide rod is mounted with a stop ring.

4. The park-position mechanism as claimed in claim 1, wherein the guide rod forms a circumferential groove.

5. The park-position mechanism as claimed in claim 4, further comprising a clip fit in the circumferential groove.

* * * * *